United States Patent [19]

Minagawa et al.

[11] 4,217,258
[45] Aug. 12, 1980

[54] STABILIZED HALOGEN-CONTAINING RESIN COMPOSITION

[75] Inventors: Motonobu Minagawa, Koshigaya; Tetsuo Sekiguchi, Hasuda; Kenji Nakazawa, Urawa, all of Japan

[73] Assignee: Argus Chemical Corp., Brooklyn, N.Y.

[21] Appl. No.: 33,570

[22] Filed: Apr. 27, 1979

[30] Foreign Application Priority Data

Apr. 28, 1978 [JP] Japan ................... 53-51448

[51] Int. Cl.² ........................ C08K 5/58; C08K 5/36
[52] U.S. Cl. .......................... 260/23 XA; 252/400 R; 252/406; 260/28.5 D; 260/45.7 S; 260/45.75 W; 260/45.75 R; 260/45.75 K; 260/45.75 S
[58] Field of Search ................ 260/45.7 S, 30.8 R, 260/DIG. 43, 23 XA, 45.75 K, 45.75 W, 45.75 R, 45.75 S, 899, 28.5 D, 880 R; 526/3, 30; 252/400 R, 406

[56] References Cited

U.S. PATENT DOCUMENTS

| | | |
|---|---|---|
| 3,723,384 | 3/1973 | Copping et al. ............. 260/45.75 N |
| 3,763,092 | 10/1973 | Mathis et al. ................ 260/45.75 N |
| 3,894,069 | 7/1975 | Ries ........................ 252/406 |

Primary Examiner—V. P. Hoke
Attorney, Agent, or Firm—Otto S. Kauder

[57] ABSTRACT

A stabilizer composition is disclosed for increasing the resistance to yellowing and loss of clarity of a vinyl halidepolymer upon heating, which comprises a thio-1,3-dicarbonyl compound represented by the formula

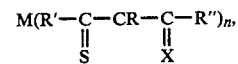

in which M represents hydrogen, an organotin group or a metal, R represents hydrogen, a hydrocarbon group or a group

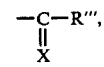

each of R, R'', and R''' represents hydrogen or an organic group, X is oxygen or sulfur, and n representing the valence of M is an integer from 1 to 4, and at least one heat stabilizer which is an alkyltin compound or a metal salt of a non-nitrogenous monocarboxylic acid or of a hydrocarbon-substituted phenol.

Stabilized vinyl halide polymer compositions, in which the above stabilizer composition is used to improve the resistance to yellowing and the clarity, are also disclosed.

16 Claims, No Drawings

STABILIZED HALOGEN-CONTAINING RESIN COMPOSITION

BACKGROUND OF THE INVENTION

This invention relates to a new stabilizer composition for enhancing the resistance to deterioration upon heating of vinyl chloride polymers, and to vinyl chloride polymers having enhanced resistance to deterioration in initial color, heat stability and clarity as a result of incorporating therein a stabilizer composition according to this invention comprising a thio-1,3-dicarbonyl compound together with a metal salt or alkyltin compound heat stabilizer.

There is a voluminous literature on the stabilization of vinyl chloride polymers. Patent disclosures of materials stated to be useful in minimizing deterioration of vinyl chloride polymers on heating number well over one thousand. Among the more important heat stabilizers in commercial use are mild alkalis such as sodium carbonate, disodium phosphate, and sodium and potassium salts of partially esterified phosphoric acids; carboxylates and phenolates of zinc, cadmium, and the alkaline earth metals; inorganic and organic lead salts; organotin carboxylates, as disclosed by Quattlebaum in U.S. Pat. No. 2,307,157; organotin mercaptides as disclosed by Leistner in U.S. Pat. Nos. 2,641,588 and 2,641,598; various metal-free organic compounds such as the polyols, e.g. mannitol, sorbitol, glycerol, pentaerythritol, organic phosphites, 1,2-epoxides, e.g., soybean oil epoxide, isooctyl epoxy-stearate and diglycidyl ether of 2,2-bis(p-hydroxyphenyl) propane, and nitrogen compounds, e.g., phenylurea, N,N'-diphenylthiourea, and 2-phenylindole. For detailed discussion of heat stabilizers for vinyl halide resins, reference may be made to the articles, L. I. Nass, in "Encyclopedia of Polymer Science and Technology" (N. Bikales, ed.) Vol. 12, pages 737 to 768 (1970); N. L. Perry "Barium-Cadmium Stabilization of Polyvinyl Chloride," *Rubber Age* 85 449–452 (June, 1959), and by H. Verity-Smith, *British Plastics* 27 176–179, 213–217, 307–311 (1954); the brochure by the same author *The Development of the Organotin Stabilizer* (Tin Research Institute, 1959) and the book *La Stabilisation des Chlorures de Polyvinyle* by F. Chevassus (Amphora, Paris, 1957).

J. Darby in U.S. Pat. No. 2,669,548 of Feb. 16, 1954 disclosed halogen-containing resin compositions having improved stability containing a mixture of a zinc salt and a calcium chelate derivative of a 1,3-dicarbonylic compound capable of keto-enol tautomerism. Zinc salts can be zinc salts of organic acids and zinc salts of weak inorganic acids, for example zinc acetate, zinc propionate, zinc octanoate, zinc ricinoleate stearate, and zinc salts of carbonic, silicic, and boric acids. Calcium chelates can be derivatives of betadiketones, betaketoacids, and the esters of betaketoacids, for example the calcium chelates of ethyl acetoacetate, phenyl acetoacetate, acetoacetic acid, acetylacetone, benzoylacetone, and diacetylacetone.

F. Ebel in U.S. Pat. No. 3,001,970 of Sept. 26, 1961 disclosed preventing the discoloration of polymers of vinylidene chloride in light by adding a small amount of a dibenzoylmethane of the general formula:

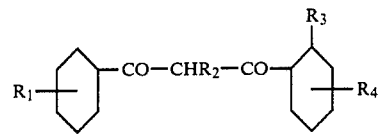

In which $R_1$ represents hydrogen or a hydroxyl radical, and $R_2$, $R_3$ and $R_4$ represent hydrogen or hydrophobic radicals. Such hydrophobic radicals are for example alkyl, cycloalkyl, aryl, aralkyl and halogen radicals.

British Pat. No. 1,141,971 of May 23, 1967 to W. R. Grace & Co. disclosed zinc complexes of beta-dicarbonyl compounds used as stabilizing additives for chlorine-containing polymers in general, and polyvinyl chloride in particular. The zinc complexes possess the general formula:

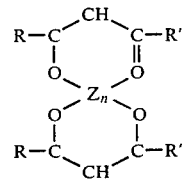

wherein R and R' are the same or different and are each hydrogen or an alkyl, alkoxy, phenyl or phenoxy group. Preferably when R represents an alkyl or alkoxy group, it contains 1 to 20 carbon atoms.

L. Weisfeld in U.S. Pat. No. 3,493,536 of Feb. 3, 1970 disclosed that diaroylmethane compounds of the general formula $C_6H_5CO-CHR-COC_6H_5$ wherein R is hydrogen or a monovalent hydrocarbon radical provide stabilizing action against the sensitizing effect of bismuth or antimony compounds on chlorine-containing materials.

M. Crochemore in U.S. Pat. No. 4,102,839 of July 25, 1978 disclosed the possibility of preventing the thermal breakdown of vinyl chloride polymers by adding 0.1 to 5% by weight of the polymer of one or more carboxylic acid salts of 2-valent metals such as calcium, barium, zinc, lead, or cadmium and 0.05 to 5% by weight of an organic compound having the formula:$R_1-CO-CH-R_2-CO-R_3$ in which $R_1$ and $R_3$, which can be alike or different, represent linear or branched alkyl or alkenyl groups with up to 30 carbon atoms, arylkyl groups with 7 to 36 carbon atoms, or aryl or cycloaliphatic groups with less than 14 carbon atoms, optionally substituted with halogen atoms, aryl or cycloaliphatic groups, methyl or ethyl groups; aliphatic $R_1$ and $R_3$ groups can also be modified by the presence of one or more —O—,

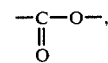

or —CO— groups, or taken together represent a 2-valent alkylene group having two to five carbon atoms; also, one of the groups $R_1$ and $R_3$ can be a hydrogen atom; $R_2$ is a hydrogen atom, an alkyl or alkenyl group with up to 30 carbon atoms which can include —O—,

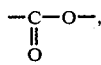

and —CO— groups, a group R—CO—R$_4$ where R$_4$ is an alkyl group with 1 to 30 carbon atoms or an aryl group when R$_1$ and R$_3$ are non-aromatic, or a group having the formula —R$_5$—CH(—CO—R$_1$)—CO—R$_3$ in which R$_5$ is an alkylene group with 1 to 6 carbon atoms. The combination of carboxylic acid metal salt and 1,3-dicarbonyl compound is stated to be superior to an equimolar quantity of 1,3-dicarbonyl compound metal chelate.

M. Gay in U.S. Pat. Nos. 4,123,399 and 4,123,400 of Oct. 31, 1978 has disclosed vinyl chloride compositions containing relative to the weight of the polymer from 0.1 to 5% of one of the four pairs of organic salts of the metals Ca—Zn, Ca—Cd, Ba—Zn, or Ba—Cd, the organic salts being salts of saturated or unsaturated, substituted or unsubstituted aliphatic carboxylic acids, or aromatic carboxylic acids, together with 0.05 to 1% by weight of a polyol, and 0.05 to 5 parts of an organic compound having the formula R$_1$—CO—CH-R$_2$—CO—R$_3$ in which R$_1$, R$_2$, and R$_3$ are defined as by Crochemore, above.

Thio-1,3-dicarbonyl compounds are known, but there has been no disclosure of any vinyl chloride polymer stabilizer containing a thio-1,3-dicarbonyl compound. Thio-1,3-dicarbonyl compounds are available by the acid catalyzed condensation reaction of hydrogen sulfide with betadiketones under chilled conditions (see for example R.K.Y. Ho et al, Australian Journal of Chemistry 1965, vol. 18, pages 1927-1932), as well as by the base catalyzed condensation reaction of a thionocarboxylic acid ester with a ketone or a carboxylic ester with a thioketone as described by E. Uhlemann et al, Journal for Praktische Chemie 1966, vol 34 pages 180-189. Thio-1,3-dicarbonyl exist in fairly readily interconverted tautomeric forms referred to in the art as enol and enethiol forms, as illustrated by the tautomeric formulas given by L. Carlsen et al (Synthesis 1976, pages 256-258) for a series of thio-1,3-dicarbonyl compounds prepared by the thionocarboxylic acid ester and methyl ketone condensation.

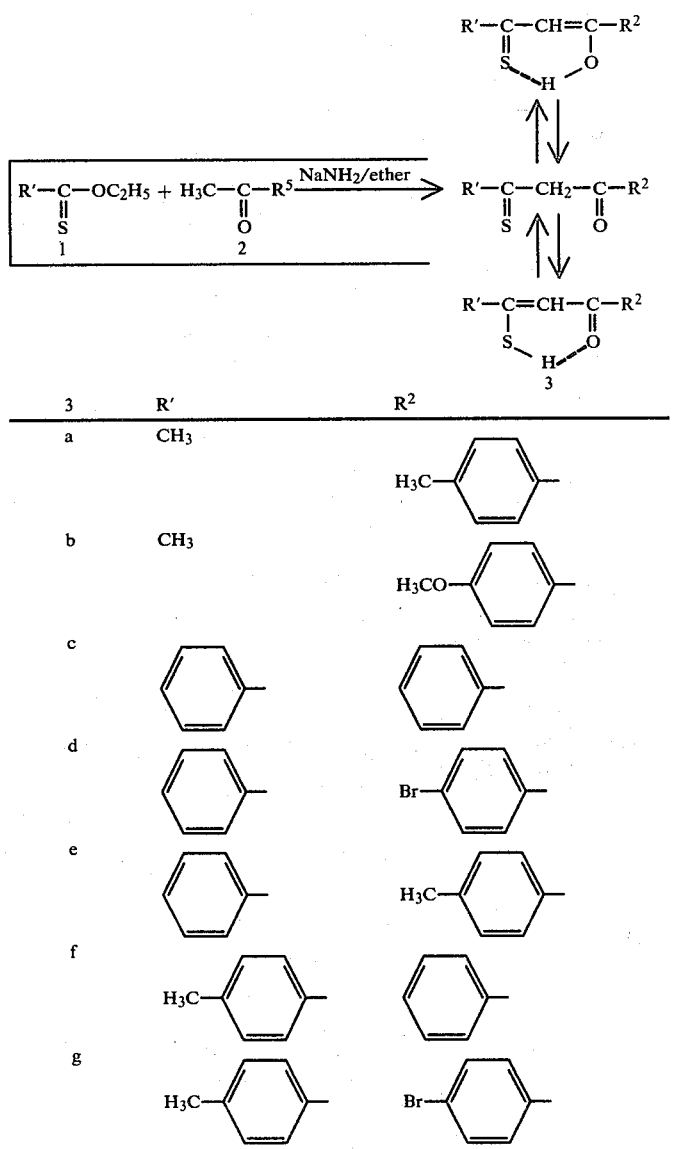

h 

i 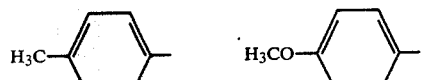

SUMMARY OF THE INVENTION

In accordance with this invention, a stabilizer composition for increasing the resistance to yellowing and loss of clarity upon heating at 175° C. of a vinyl halide polymer, comprises (A) at least one thio-1,3-dicarbonyl compound represented by the formula

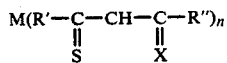

in which M represents a hydrogen atom, an organotin group, or one of the metals Li, Na, K, Mg, Ca, Sr, Ba, Zn, Al, Sb, Ni, Sn, Cu or Zr; R represents a hydrogen atom, an alkyl group, an aryl group, an alkaryl group, an aralkyl group, an alkenyl group, or a group

R', R", and R''' each independently represent a hydrogen atom, an alkyl group, an alkenyl group, an aryl group, an alkoxyaryl group, an alkaryl group, an aralkyl group, a cycloalkyl group, or a cycloalkenyl group, any of which can carry a halogen substitutent; X independently at each occurrence is oxygen or sulfur; and n representing the valence of M is an integer from 1 to 4, and (B) at least one heat stabilizer which is an alkylthin compound or a metal salt of a non-nitrogenous monocarboxylic acid having 6 to 24 carbon atoms or of a hydrocarbon-substituted phenol having 10 to 30 carbon atoms. For each 100 parts by weight of vinyl halide polymer being stabilized, the quantity of stabilizer composition used suitably provides 0.001 to 1 part by weight of thio-1,3-dicarbonyl compound and 0.01 to 5 parts by weight of the metal carboxylate, metal phenolate, or alkylthin compound heat stabilizer. In a preferred range of compositions, the proportions of the 1,3-dicarbonyl compound to the heat stabilizer are from 0.01 part to 1 part of the former for each part by weight of the latter.

DESCRIPTION OF PREFERRED EMBODIMENTS

The thio-1,3-dicarbonyl compound component of the stabilizer composition of this invention has from 3 to about 40 carbon atoms and can be represented by the formula

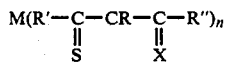

in which n (the valence of M) is an integer from one to four; X is oxygen or sulfur; R is a hydrogen atom, an acyl group

where R''' is alkyl or aryl, or R'; each of R', R" and R''' can be hydrogen, a halohydrocarbon group, an alkoxyhydrocarbon group, an alkylenedioxyhydrocarbon group, or a hydrocarbon group; and M is hydrogen or an organotin group or a metal as defined above.

When in this formula M is a hydrogen atom, the formula becomes

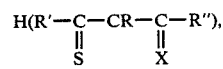

which is a way to indicate by a single expression that the hydrogen atom can be linked in more than one way, as in the tautomeric formulas I to III (i.e. formulas of compounds in readily movable equilibrium with one another)

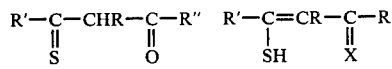

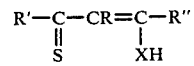

the latter two of which are identical when X is sulfur and R' and R" are the same. The relative proportions of tautomers I, II, and III in the thio-1,3-dicarbony- compounds is a function of the identity of R and R", but is not critical, all forms being effective in the stabilizer composition of this invention. When M is a metal, the formula

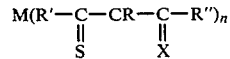

structural formulas can be written differing in the location of various linkages (as illustrated for zinc acetylthiobenzoylmethane by formulas IV to VII below); all are equivalent representations of a single compound which is better represented as a "hybrid" of all formulas than by any single one. In formulas IV to VII, Ph represents phenyl and Me represents methyl.

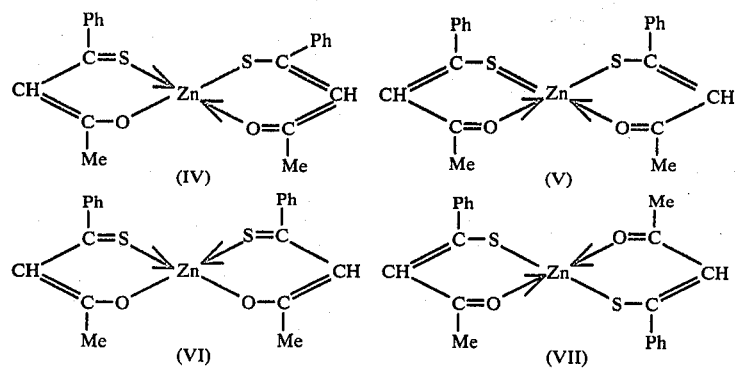

In the formula of thio-1,3-dicarbonyl metal compounds, n is the valence of the metal and defines the number of thio-1,3-dicarbonyl groups per metal atom, as shown:

| M | Li | Na | K | Mg | Ca | Sr | Ba | Zn | Al | Sb | Ni | Sn | Cu | Zr | ZrO |
|---|----|----|---|----|----|----|----|----|----|----|----|----|----|----|-----|
| n | 1  | 1  | 1 | 2  | 2  | 2  | 2  | 2  | 3  | 3  | 2  | 2  | 2  | 4  | 2   |

When M represents an organotin group, there can be from one to three organic groups linked to tin through carbon. Each organic group linked to carbon can have from one to eighteen carbon atoms and if desired ester groups; alkyl groups and alkoxycarbonylalkyl groups are preferred, for example methyl, butyl, octyl, stearyl, methoxy carbonylethyl, ethoxycarbonylmethyl, and butoxycarbonylethyl. The number of organic groups linked to tin through carbon is related to n, which is 4 less the number of such organic groups, as shown:

| TYPE OF ORGANOTIN GROUP | MONO-ORGANOTIN | DI-ORGANOTIN | TRIOR-GANOTIN |
|---|---|---|---|
| n | 3 | 2 | 1 |

When there are two or three organic groups linked to tin through carbon, the groups can be the same or different. Representative organotin groups include methyltin, n-butyltin, isobutyltin, 2-ethylhexyltin, methoxycarbonylethyltin, dimethyltin di-n-butyltin, di(ethoxycarbonylethyl) tin, methyl-n-octyltin, n-butyl-n-butoxycarbonylethyltin, di-n-octyltin, tri(methoxycarbonylethyl)tin, tri-n-octyltin, and methyldi(2-ethlhexyloxycarbonylethyl)tin. In the tio-1,3-dicarbonyl compound, hydrocarbon groups R, R', R" and R'" can be open chain or cyclic and include such aliphatic, cycloaliphatic, and aromatic hydrocarbon groups as alkyl and alkenyl groups having 1 to 18 carbon atoms, cycloalkyl, cycloalkenyl and cycloalkylalkylene, and alkylcycloalkyl groups having 5 to 18 carbon atoms, and non-condensed aryl groups (including aralkyl and alkyaryl) having 6 to 18 carbon atoms, for example methyl, ethyl, propyl, isopropyl, isobutyl, n-butyl, s-butyl, t-butyl, 1-pentyl, 3-pentyl, 1-hexyl, 1-heptyl, 3-heptyl, 1-octyl, 2,4,4-trimethylpentyl, t-octyl, nonyl, decyl, tridecyl, pentadecyl, heptadec-8-en-1-yl, n-octadecyl, allyl, methallyl, 2-hexenyl, 1-methylcyclopentyl, cyclohexyl, cyclohexanepropyl, phenyl, m-tolyl, p-ethylphenyl, t-butylphenyl, benzyl, phenylpropyl and nonylbenzyl. Halohydrocarbon R, R', R", and R'" groups include dichloromethyl, heptafluoropropyl, p-bromophenyl, and 3,4-dichlorobenzyl. Alkoxyhydrocarbon R, R', R", and R'" groups include ethoxymethyl, n-butoxymethyl, 2-methoxyethyl, 2-methoxyphenyl, and 4n-octoxphenylbenzyl. R, R', R" and R'" alkylenedioxyhydrocarbon groups include 3(ethylenedioxypropyl) and 3,4-methylenedioxyphenyl.

Particularly preferred thio-1,3-dicarbonyl compounds represented by the above general formula according to the invention include the compounds shown in Table 1 as well as their tautomers, metal derivatives, and organotin derivatives.

TABLE 1

| No. 1 | $CH_3-\underset{\underset{S}{\|}}{C}-CH_2-\underset{\underset{O}{\|}}{C}-C_5H_{11}$ | 2-THIOXONONAN-4-ONE |
|---|---|---|
| No. 2 | $n-C_6H_{13}-\underset{\underset{S}{\|}}{C}-CH_2-\underset{\underset{O}{\|}}{C}-CH_3$ | 2-OXODECANE-4-THIONE |
| No. 3 | $n-C_5H_{11}-\underset{\underset{S}{\|}}{C}-CH_2-\underset{\underset{O}{\|}}{C}-C_2H_5$ | 3-OXODECANE-5-THIONE |
| No. 4 | $CH_3-\underset{\underset{S}{\|}}{C}-CH_2-\underset{\underset{O}{\|}}{C}-C_{17}H_{35}$ | 2-THIOXOHENEICOSAN-4-ONE |
| No. 5 | $CH_3-\underset{\underset{S}{\|}}{C}-CH_2-\underset{\underset{O}{\|}}{C}-C_{13}H_{27}$ | 2-THIOXOHEPTADECAN-4-ONE |
| No. 6 | $CH_3-\underset{\underset{S}{\|}}{C}-CH_2-\underset{\underset{O}{\|}}{C}-C_{11}H_{23}$ | 2-THIOXOPENTADECAN-4-ONE |

TABLE 1-continued

| No. | Structure | Name |
|---|---|---|
| No. 7 | $C_{17}H_{35}-\underset{S}{\overset{\|}{C}}-CH_2-\underset{O}{\overset{\|}{C}}-C_{17}H_{35}$ | 18-OXOHEPTATRIACONTANE-20-THIONE |
| No. 8 | $C_7H_{15}-\underset{S}{\overset{\|}{C}}-CH_2-\underset{O}{\overset{\|}{C}}-C_3H_7$ | 4-OXOTRIDECANE-6-THIONE |
| No. 9 | $CH_3-\underset{S}{\overset{\|}{C}}-CH_2-\underset{S}{\overset{\|}{C}}-CH_3$ | PENTANE-2,4-DITHIONE |
| No. 10 | $CH_3-\underset{S}{\overset{\|}{C}}-CH_2-\underset{S}{\overset{\|}{C}}-C_{17}H_{35}$ | HENEICOSANE-2,4-DITHIONE |
| No. 11 | $C_{11}H_{23}-\underset{S}{\overset{\|}{C}}-CH_2-\underset{S}{\overset{\|}{C}}-C_{11}H_{23}$ | PENTACOSANE-12,14-DITHIONE |
| No. 12 | $CH_3-\underset{S}{\overset{\|}{C}}-CH\begin{smallmatrix}\overset{S}{\overset{\|}{C}}-CH_3 \\ \overset{\|}{C}-CH_3 \\ \underset{S}{\|}\end{smallmatrix}$ | 3-THIOACETYLPENTANE-2,4-DITHIONE |
| No. 13 | $C_7H_{15}-\underset{S}{\overset{\|}{C}}-\overset{CH_3}{\underset{\|}{CH}}-\underset{O}{\overset{\|}{C}}-CH_3$ | 2-ACETYLDECANE-3-THIONE |
| No. 14 | $CH_3-\underset{S}{\overset{\|}{C}}-CH\begin{smallmatrix}\overset{O}{\overset{\|}{C}}-CH_3 \\ \overset{\|}{C}-CH_3 \\ \underset{O}{\|}\end{smallmatrix}$ | 1,1-DIACETYLPROPANE-2-THIONE |
| No. 15 | $n\text{-}C_5H_{11}-\underset{S}{\overset{\|}{C}}-CH\begin{smallmatrix}\overset{O}{\overset{\|}{C}}\text{-}n\text{-}C_5H_{11} \\ \overset{\|}{C}\text{-}n\text{-}C_5H_{11} \\ \underset{O}{\|}\end{smallmatrix}$ | 6-OXO-7-HEXANOYLTRIDECANE-8-THIONE |
| No. 16 | $CH_3-\underset{S}{\overset{\|}{C}}-CH_2-\underset{O}{\overset{\|}{C}}-C_6H_5$ | 1-BENZOYLPROPANE-2-THIONE |
| No. 17 | $C_5H_{11}-\underset{O}{\overset{\|}{C}}-CH_2-\underset{S}{\overset{\|}{C}}-C_6H_5$ | 1-PHENYL-1-THIOXOOCTAN-3-ONE |
| No. 18 | $C_{17}H_{35}-\underset{S}{\overset{\|}{C}}-CH_2-\underset{O}{\overset{\|}{C}}-C_6H_5$ | 1-BENZOYLNONADECANE-2-THIONE |
| No. 19 | $C_{13}H_{27}-\underset{S}{\overset{\|}{C}}-CH_2-\underset{O}{\overset{\|}{C}}-C_6H_5$ | 1-BENZOYLPENTADECANE-2-THIONE |
| No. 20 | $CH_3-\underset{S}{\overset{\|}{C}}-CH_2-\underset{S}{\overset{\|}{C}}-C_6H_5$ | 1-PHENYLBUTANE-1,3-DITHIONE |
| No. 21 | $C_{17}H_{35}-\underset{S}{\overset{\|}{C}}-CH_2-\underset{S}{\overset{\|}{C}}-C_6H_5$ | 1-PHENYLEICOSANE-1,3-DITHIONE |
| No. 22 | $C_{11}H_{23}-\underset{S}{\overset{\|}{C}}-CH_2-\underset{O}{\overset{\|}{C}}-C_6H_5$ | 1-BENZOYLTRIDECANE-2-THIONE |

TABLE 1-continued

No. 23 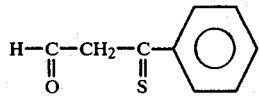 1-OXO-3-PHENYLPROPANE-3-THIONE

No. 24 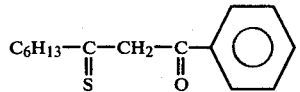 1-BENZOYLOCTANE-2-THIONE

No. 25 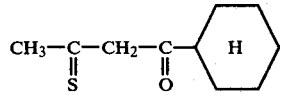 1-HEXAHYDROBENZOYLPROPANE-2-THIONE

No. 26 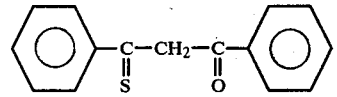 1-BENZOYL-2-PHENYLETHANE-2-THIONE

No. 27 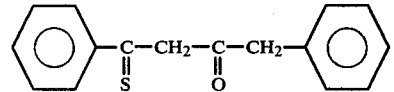 1,4-DIPHENYL-1-THIOXOBUTAN-3-ONE

No. 28 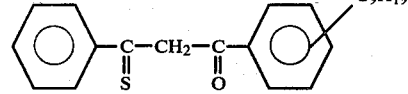 1-NONYLBENZOYL-2-PHENYLETHANE-2-THIONE

No. 29 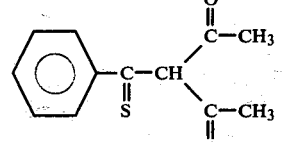 1,1-DIACETYL-2-PHENYLETHANE-2-THIONE

No. 30 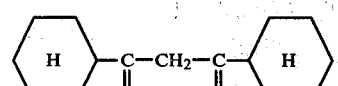 1-HEXAHYDROBENZOYL-2-CYCLOHEXYLETHANE-2-THIONE

No. 31 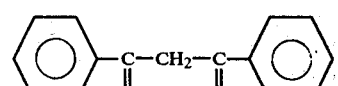 1,3-DIPHENYLPROPANE-1,3-DITHIONE

No. 32 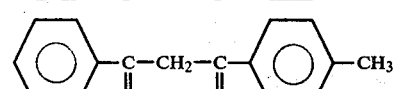 1-(p-Tolyl)-3-phenylpropane-1,3-dithione

No. 33 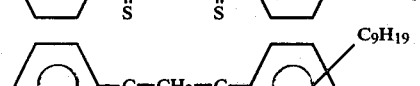 1-NONYLPHENYL-3-PHENYLPROPANE-1,3-DITHIONE

No. 34 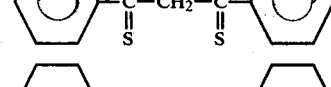 1,3-DICYCLOHEXYLPROPANE-1,3-DITHIONE

No. 35 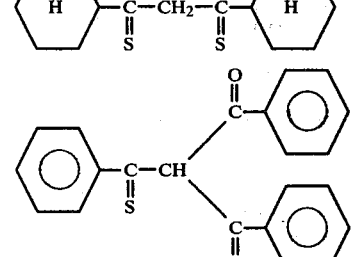 1,1-DIBENZOYL-2-PHENYLETHANE-2-THIONE

The metal salt heat stabilizers that can be used to stabilize vinyl halide polymer compositions together with a thio-1,3-dicarbonyl compound of this invention are preferably salts of at least one bivalent non-transition metal, such as barium, calcium, magnesium, strontium, stannous tin and zinc.

In the salt, the acid can be any organic non-nitrogenous monocarboxylic acid having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with non-reactive groups, such as halogen, sulfur and hydroxyl. By the term "alicyclic" it will be understood that there is intended any cyclic acid in which the ring is non-aromatic and composed solely of carbon atoms, and such acids may if desired have inert, non-reactive substituents such as halogen, hydroxyl, alkyl radicals, alkenyl radicals and other carbocyclic ring structures condensed therewith. The oxygen-containing heterocyclic compounds can be aromatic or non-aromatic and can include oxygen and carbon in the ring structure, such as alkyl-substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, n-octoic acid, isooctoic acid, 3,5,5-trimethyl hexoic acid, capric acid, undecyclic acid, lauric acid, myristic acid, palmitic acid, margaric acid, stearic acid, oleic acid, ricinoleic acid, behenic acid, chlorocaproic acid, hydroxy-capric acid, ethyl acetoacetic acid, benzoic acid, phenyl-acetic acid, butylbenzoic acid, ethylbenzoic acid, propylbenzoic acid, hexylbenzoic acid, salicyclic acid, naphthoic acid, 1-naphth alene acetic acid, orthobenzoyl benzoic acid, naphthenic acids derived from petroleum, abietic acid, dihydroabietic acid, hexahydrobenzoic acid, and methyl furoic acid, as well as partially esterified dibasic acids such as monobutyl phthalate, isooctyl maleate, ethylene glycol maleate, and 2-ethoxy ethylmaleate.

In combination with the above metal salts of organic acids, or in lieu thereof, a metal salt of a hydrocarbon-substituted phenol can be used. The hydrocarbon substituents contain from four to twenty-four carbon atoms each. The metal can be an alkali metal or alkaline earth metal such as sodium, potassium, lithium, calcium, strontium, magnesium and barium. Among such polyvalent metal phenolates there can be mentioned the magnesium, barium, calcium, strontium, tin and zinc salts of n-butyl phenol, t-nonyl phenol, n-decyl phenol, t-dodecyl phenol, t-octyl phenol, isohexyl phenol, octadecyl phenol, diisobutyl phenol, methyl propyl phenol, diamyl phenol, methyl isohexyl phenol, methyl t-octyl phenol, di-t-nonyl phenol, ortho or para phenyl phenol. The modified metal phenolates disclosed by M. Pollock in U.S. Pat. No. 3,630,979 of Dec. 28, 1971 and by M. Minagawa in U.S. Pat. No. 3,733,288 of May 15, 1973 are also suitable.

Mixtures of salts of various metals can be used, such as mixed zinc and tin salts with the alkaline earth metal salts, e.g., barium and zinc stearates, as in U.S. Pat. No. 2,446,976.

The alkyltin heat stabilizers that can be used to stabilize vinyl halide polymer compositions together with a thio-1,3-dicarbonyl compound according to this invention are compounds of 4-valent tin having from one to two alkyl groups linked to tin through carbon and the remaining tin valences taken up by mercaptide, sulfide, oxide, alcoholate, carboxylate, mercaptoester, mercaptocarboxylic acid, or mercapto ester sulfide linkages.

Preferred are particularly the dialkyltin salts of the monocarboxylic acids defined above, in which the alkyl groups have 1 to 12 carbon atoms, and alkyltin mercaptides represented by the formula $$R_a Sn(S(CH_2)_b Y)_{4-a}$$

in which R is an alkyl group having 1 to 12 carbon atoms, a is 2 or 3, b is an integer from 1 to 3, and Y is a hydrogen atom, an alkyl group having 6 to 18 carbon atoms, an alkoxy group having 6 to 18 carbon atoms, an acyloxy group having 2 to 22 carbon atoms, or a carboxyalkyl group having 1 to 18 carbon atoms in the alkyl group.

Representative alkyltin heat stabilizers include dibutyltin di-2-ethylhexoate, dimethyltin di(n-tetradecyl mercaptide), dibutyltin 3-mercaptopropionate, monobutyltin sulfide, dibutyltin sulfide, di-n-octyltin oxide, butyltin tris (hexyl 3-mercaptopropionate), and methyltin tris(nonanoyloxyethyl mercaptide).

A large disclosure of useful alkyltin heat stabilizers by M. Minagawa in U.S. Pat. No. 4,146,518 of Mar. 27, 1979, Column 1 lines 7 to 48 is here incorporated by references.

Stabilizer compositions in accordance with this invention can be in solid, liquid or paste form. Liquid compositions can be prepared by blending ingredients and heating, if necessary, at 40°–180° C. for up to 4 hours to achieve the homogeneity and storage stability. Inert ingredients that can be added to the stabilizer compositions to improve their handling convenience include solvents such as hydrocarbons, 2-ethylhexanol, isodecyl alcohol, 2-ethoxyethanol, and 2(2-butoxyethoxy)ethanol; paste consistency modifiers such as finely divided silica, polyethylene glycols and polypropylene glycols and their monoalkyl and monaryl ethers, and water; anticaking agents such as talc, magnesium trisilicate, sodium silicoaluminate, and aluminum calcium silicate.

Additional stabilizers that can be used together with the stabilizer composition of this invention, and blended therewith if desired, include 1,2-epoxides, phenols, polyhydric alcohols, organic phosphites, thioethers and thioether carboxylic acids, esters and amides of thioalkylenedicarboxylic, 3-aminocrotonic, and nitrilotrialkylenetricarboxylic acids, certain nitrogen compounds, and UV absorbers such as benzophenones, benzotriazoles, salicylates, substituted acrylonitriles, and salts or chelates of nickel or chromium.

1,2-Epoxides that can be used with the stabilizer composition of this invention include epoxidized triglyceride oils such as epoxysoybean oil, epoxylinseed oil, expoxidized fish oils and epoxidized tallow; epoxidized esters such as methyl, isobutyl, and 2-ethylhexyl epoxystearates, epoxidized butyl and isooctyl esters of tall oil fatty acids, and 3,4-epoxycyclohexanemethyl 3,4-epoxycyclohexanecarboxylate; epoxidized hydrocarbons such as epoxidized polybutadiene and 1,2,5-tris(epoxyethyl)benzene; and epoxidized ethers such as 1,2,3-tris(2',3'-epoxypropoxy)propane and 4,4'-isopropylidenebis(phenyl glycidyl ether). A comprehensive disclosure of 1,2-epoxide stabilizers by T. Sekiguchi in U.S. Pat. No. 4,105,627 of Aug. 8, 1978, column 8 line 48 to column 9 line 40 is here incorporated by reference. Epoxide use levels typically range from 0.5 to 25 parts per 100 parts of vinyl halide polymer.

Typical phenol stabilizers are butylated hydroxy-toluene (BHT), 4,4'-isopropylidenebisphenol, and 1,1,3-tris(2'methyl-4'-hydroxy-5'-t-butylphenol)butane. A comprehensive disclosure of phenol stabilizers at column 16 line 49 to column 21 line 8 of M. Minagawa U.S. Pat. No. 3,849,370 issued Nov. 19, 1974 is here incorporated by reference.

Aliphatic polyhydroxy compounds can be included with the stabilizer composition of this invention in amounts corresponding to 0.1 to about 1 part per 100 parts of polymer being stabilized. Typical aliphatic polyhydroxy compounds are glycerol, polyglycerol, mono-, di-, and tri-pentaerythritol, mannitol, sorbitol, and partial esters of these with saturated and unsaturated fatty acids having 6 to 22 carbon atoms.

The esters, amides, and hydrazides of thiodialkylene dicarboxylic acids and nitrilotri-alkylenetricarboxylic acids can be included with the stabilizer composition of this invention in amounts corresponding to 0.1 to about 1 part per 100 parts of polymer. Typical of these are dimethyl thiodipropionate, dilauryl and distearyl thiodipropionates, 2,2'-thiobis(acetyl ethanolamine), 3,3'-thiobis(propionyldiisopropanolamine, nitrilotriacetic acid (NTA) propylene glycol ester, NTA tris(ethylamide), NTA bis(hydroxyethyl) N-butylamide, 3,3'-thiodipropionyldihydrazide and 6,6'-thiodihexanoyldihydrazide. A comprehensive disclosure of thiodipropionate compounds that can be used from column 21 line 9 to column 22 line 65 of M. Minagawa U.S. Pat. No. 3,849,370 is here incorporated by reference.

Organic phosphites that can be used in vinyl halide polymer compositions containing the stabilizer composition of this invention include phenyl di-2-ethylhexyl phosphite, tri-isodecyl phosphite, and pentaerythritol diisooctyldiphosphite. A comprehensive disclosure of suitable organic phosphites by T. Sekiguchi in U.S. Pat. No. 4,105,627 of Aug. 8, 1979 column 9 line 41 to column 12 line 16 is here incorporated by reference.

Organic nitrogen compounds that can be used with the stabilizer compositions of this invention in amounts of about 0.05 to about 0.5 parts per 100 parts of polymer being stabilized include 2-ethylhexyl 3-aminocrotonate, 1,4-butanediol bis(3-aminocrotonate) and 2,2'-thiodiethyl 3-aminocrotonate; thiocarbanilide and 2-phenylindole, 1,3-dibutylthiourea, phenylurea, and p-ethoxyphenylurea.

Vinyl halide polymers and other halogen containing resins that can be stabilized with the stabilizer composition of this invention include polyvinylchloride, polyvinylbromide, polyvinylfluoride, polyvinylidenechloride, chlorinated polyethylene, chlorinated polypropylene, brominated polyethylene, rubber hydro chloride, vinylchloride-vinylacetate copolymer, vinylchloride-ethylene copolymer, vinylchloridepropylene copolymer, vinylchloridestyrene copolymer, vinylchloride-isobutylene copolymer, vinylchloride-vinylidenechloride copolymer, vinylchloride-styrenemaleic anhydride terpolymer, vinylchloride-styrene-acrylonitrileterpolymer, vinylchloride-butadiene copolymer, vinylchloride-isoprene copolymer, vinylchloride-chlorinated propylene copolymer, vinylchloride-vinylidenechloride-vinylacetate terpolymer, vinylchloride-ethyl-acrylate copolymer, vinylchloride-maleate-copolymer, vinylchloride-methyl-methacrylate copolymer, vinylchloride-acrylonitrile copolymer, internally plasticized polyvinylchloride, and blends of the above halogen-containing resin and alpha-olefin polymers. The terms "polyvinylchloride" and "vinyl chloride polymer" as used herein include any polymer formed at least in part of the recurring group,

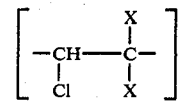

and having a chlorine content of excess of 40%. In this group, the X groups can each be either hydrogen or chlorine. In polyvinyl chloride homopolymers, each of the X groups is hydrogen. Thus, the term includes not only polyvinyl chloride homopolymers but also afterchlorinated polyvinyl chlorides as a class, for example, those disclosed in British Pat. No. 893,288 and also copolymers of vinyl chloride in a major proportion and other copolymerizable monomers in a minor porportion, as already mentioned.

The invention also is applicable to mixtures of polyvinyl chloride in a major proportion with a minor proportion of other synthetic resins such as chlorinated polyethylene or copolymers of acrylonitrile with butadiene and styrene.

The invention is of application to the stabilization of rigid polyvinyl chloride resin compositions, that is, resin compositions which are formulated to withstand high processing temperatures, of the order of 190° C. and higher, and of plasticized polyvinyl chloride resin compositions of conventional formulation where resistance to heat distortion is not a requisite. The respective definition of rigid and plasticized resins are as follows. The rigid resins are those resins to which plasticizers are not added, and which are generally worked at about 190° C. The ASTM definition (1961 D-833, Part 9, page 804) is as follows:

"a plastic which has a stiffness or apparent modulus of elasticity greater than 7000 grams per square centimeter (100,000 psi) at 23° C."

The plasticized resin would therefore have a modulus of elasticity of less than 7000 grams per square centimeter, and would have added to it the plasticizer compound. Conventional plasticizers well known to those skilled in the art can be employed such as, for example, dioctyl phthalate, octyl diphenyl phosphate and epoxidized soybean oil.

Following are the methods used in testing vinyl chloride polymer compositions containing stabilizer compositions according to this invention or control compositions used for comparison purposes.

Oven heat stability: samples of each indicated formulation proportioned to 200 grams of vinyl chloride polymer are compounded on a two-roll mill until well mixed and removed in the form of sheets 1 mm in thickness. Strips cut from each sheet are exposed in an air circulating oven at the indicated temperature, and one strip of each formulation removed every five minutes and attached to a record card. Heat stability was recorded as the time in minutes to the first failure point represented by a deep organe, red, brown or black color.

Initial Color and Heat Color: These properties are rated by means of the Hunter colorimeter and expressed as % yellowness, smaller numbers indicating less yellow samples. Initial color refers to yellowness measured with a sample as removed from the mill. Heat color refers to yellowness measured with a sample heated in an air circulating oven at the indicated temperature for the time shown.

Clarity is rated by viewing samples against a black background and comparing to a standard sample. Unless otherwise indicated the standard sample is a sample made up of 100 parts of PVC (Geon 103EP), 48 parts of dioctyl phthalate, 2 parts epoxysoybean oil, 1.0 part barium stearate, and 0.2 part zinc stearate, see Control 2-1 formulation below.

EXAMPLE 1

The excellent stabilizing effect is examined by the following method.

The following composition are processed with calender and prepared sheet of 1 mm in thickness, cut off the specimen of 20×15 mm, set in the Geer oven heated at 190° C. and observed initial color, heat-color and heat stability.

The results are shown in Table 2.

| FORMULATION | | |
|---|---|---|
| POLYVINYLCHLORIDE RESIN (GEON 103EP) | 100 | parts by weight |
| EPOXIDIZED SOYBEAN OIL | 3.0 | |
| Ba STEARATE | 0.5 | |
| Ca STEARATE | 0.5 | |
| Zn LAURATE | 0.2 | |
| THIO-1,3-DICARBONYL COMPOUND SAMPLE (TABLE-2) | 0.1 | |

The results tabulated above demonstrate the remarkable effectiveness of the thio-1,3-dicarbonyl compounds in preventing yellowing of vinyl chloride polymer compositions according to this invention. All samples according to the invention heated 30 minutes at 190° C. and certain samples according to the invention heated 60 minutes at 190° C. were no more yellow than unexposed control samples identical except for the omission of the thio-1,3-dicarbonyl compound.

EXAMPLE 2

Sheets of 1 mm in chickness were prepared by mixing roll according to the following formulation, and tested for oven heat stability at 190° C., initial color and clarity.

The results are shown in Table 3.

| (FORMULATION) | | |
|---|---|---|
| PVC (GEON 103EP) | 100 | parts by weight |
| DIOCTYL PHTHALATE | 48 | |
| EPOXIDIZED SOYBEAN OIL | 2 | |
| Ba STEARATE | 1.0 | |
| Zn STEARATE | 0.2 | |
| THIO-1,3-DICARBONYL COMPOUND Sample (TABLE - 3) | 0.1 | |

TABLE 2

| NO. | SAMPLES | HEAT COLOR (190° C., YELLOWNESS) | | | | |
|---|---|---|---|---|---|---|
| | | 0 Min. | 15 Min. | 30 Min. | 60 Min. | 90 Min. |
| CONTROL | | | | | | |
| 1-1 | NONE | 20 | 22 | 26 | 40 | 58 |
| EXAMPLE | | | | | | |
| 1-1 | 2-THIOXONONAN-4-ONE | 11 | 14 | 18 | 20 | 36 |
| 1-2 | 18-OXOHEPTATRIACONTANE-20-THIONE | 10 | 12 | 16 | 18 | 33 |
| 1-3 | PENTANE-2,4-DITHIONE | 10 | 12 | 16 | 20 | 36 |
| 1-4 | 2-ACETYLDECANE-3-THIONE | 10 | 14 | 18 | 22 | 34 |
| 1-5 | 1,1-DIACETYLPROPANE-2-THIONE | 9 | 12 | 16 | 20 | 34 |
| 1-6 | 1-BENZOYLNONADECANE-2-THIONE | 10 | 14 | 18 | 20 | 36 |
| 1-7 | 1-BENZOYL-2-PHENYL-ETHANE-2-THIONE | 8 | 10 | 14 | 18 | 32 |
| 1-8 | 1-HEXAHYDROBENZOYL-2-CYCLOHEXYLETHANE-2-THIONE | 10 | 16 | 18 | 20 | 38 |
| 1-9 | 1,3-DIPHENYLPROPANE-1,3-DITHIONE | 11 | 14 | 16 | 22 | 34 |
| 1-10 | SODIUM(2-THIOXONONAN-4-ONE) | 12 | 14 | 18 | 24 | 38 |
| 1-11 | BARIUM(2-THIOXOHENEICOSAN-4-ONE) | 10 | 12 | 16 | 24 | 36 |
| 1-12 | CALCIUM(PENTANE-2,4-DITHIONE) | 10 | 14 | 18 | 26 | 36 |
| 1-13 | POTASSIUM (1-PHENYL-1-THIOXOOCTAN-3-ONE) | 10 | 14 | 18 | 24 | 34 |
| 1-14 | CALCIUM (1-BENZOYL-2-PHENYLETHANE-2-THIONE) | 8 | 12 | 18 | 22 | 36 |
| 1-15 | DIMETHYLTIN (1-NONYL-BENZOYL-2-PHENYL-ETHANE-1,3-DITHIONE) | 8 | 14 | 18 | 24 | 34 |
| 1-16 | MONOOCTYLTIN (1-NONYL-PHENYL-3-PHENYLPROPANE-1,3-DITHIONE) | 10 | 14 | 18 | 24 | 36 |

TABLE 3

| NO. | SAMPLES | INITIAL COLOR % YELLOWNESS | HEAT COLOR 190° C. 30 Mins. | HEAT STABILITY (190° C.) | CLARITY |
|---|---|---|---|---|---|
| CONTROL | | | | | |
| 2-1 | NONE | 30 | 65 | 90 | Medium |
| 2-2 | DIBENZOYLMETHANE | 10 | 16 | 85 | A Little Superior |
| 2-3 | DEHYDROACETIC ACID | 17 | 25 | 85 | Superior |
| EXAMPLE | | | | | |
| 2-1 | 3-OXODECANE-5-THIONE | 6 | 8 | 95 | Excellent |
| 2-2 | 2-THIOXOPENTADECAN-4-ONE | 8 | 12 | 90 | Excellent |
| 2-3 | PENTACOSANE-12,14-DITHIONE | 6 | 8 | 90 | Superior |
| 2-4 | 1-BENZOYLPROPANE 2-THIONE | 6 | 10 | 100 | Excellent |
| 2-5 | 1-PHENYLBUTANE-1,3-DITHIONE | 8 | 10 | 85 | Superior |
| 2-6 | 1-OXO-3-PHENYLPROPANE-3-THIONE | 8 | 12 | 90 | Superior |
| 2-7 | 1-BENZOYL-2-PHENYL-ETHANE-2-THIONE | 8 | 14 | 85 | Superior |
| 2-8 | 1-NONYLBENZOYL-2-PHENYLETHANE-2-THIONE | 10 | 8 | 85 | Superior |
| 2-9 | 1,3-DICYCLOHEXYLPROPANE-1,3-DITHIONE | 8 | 10 | 90 | Excellent |
| 2-10 | ZINC(18-OXOHEPTATRIA-CONTANE-20-THIONE) | 8 | 10 | 95 | Excellent |
| 2-11 | LITHIUM (1-BENZOYL-PROPANE-2-THIONE) | 6 | 12 | 90 | Excellent |
| 2-12 | MAGNESIUM(1-PHENYLE-ICOSANE-1,3-DITHIONE) | 6 | 12 | 90 | Superior |
| 2-13 | ANTIMONY(1-HEXAHYDRO-BENZOYLPROPANE-2-THIONE) | 10 | 14 | 90 | Superior |
| 2-14 | BARIUM(1-BENZOYL-2-PHENYLETHANE-2-THIONE) | 8 | 12 | 95 | Superior |
| 2-15 | STANNOUS(1-HEXAHYDROBENZOYL-2-CYCLOHEXYLETHANE-2-THIONE) | 10 | 12 | 90 | Superior |

These results show the unexpectedly favorable effectiveness of the stabilizer compositions of the invention, in which a thio-1,3-carbonyl compound is used. Initial color, clarity, yellowing after 30 minutes exposure at 190° C. and ultimate heat stability were all in favor of the stabilizer compositions of the invention as compared to prior art compositions lacking the thio-1,3-dicarbonyl compound or made instead with a betadiketone or ketoacetic acid compound.

EXAMPLE 3

The same test as Example 1 was carried out in accordance with the following formulation.
The results are shown in Table 4.

| (FORMATION) | | |
|---|---|---|
| PVC | 80 | parts by weight |
| DOP | 40 | |
| CHORINATED POLYETHYLENE | 20 | |
| E-500 CHLORINATED PARAFFIN | 10 | |
| CaCO$_3$ | 20 | |
| ELECTRICAL GRADE CLAY (Southern Clays Co.) | 10 | |
| Ca-STEARATE | 0.5 | |
| Zn-STEARATE | 0.3 | |
| Ca$_3$(PO$_4$)$_2$ | 0.5 | |
| Ca(OH)$_2$ | 2.5 | |
| THIO-1,3-DICARBONYL COMPOUND | 0.1 | |

TABLE 4

| NO. | SAMPLE COMPOUNDS | HEAT DETERIORATION (190° C., YELLOWNESS) | | | | | |
|---|---|---|---|---|---|---|---|
| | | 0 Min. | 15 Min. | 30 Min. | 60 Min. | 120 Min. | 180 Min. |
| CONTROL | | | | | | | |
| 3-1 | NONE | 8 | 12 | 16 | 26 | 60 | — |
| EXAMPLE | | | | | | | |
| 3-1 | 2-OXODECANE-4-THIONE | 4 | 6 | 8 | 12 | 20 | 54 |
| 3-2 | 2-THIOXOHENE-ICOSAN-4-ONE | 4 | 8 | 10 | 14 | 22 | 52 |
| 3-3 | 2-THIOXOHEPTA-DECAN-4-ONE | 5 | 8 | 10 | 12 | 22 | 56 |
| 3-4 | 2-THIOXOPENTA-DECAN-4-ONE | 8 | 7 | 8 | 10 | 24 | 54 |
| 3-5 | 18-OXOHEPTATRIA-CONTANE-20-THIONE | 6 | 8 | 8 | 14 | 22 | 54 |

TABLE 4-continued

| NO. | SAMPLE COMPOUNDS | HEAT DETERIORATION (190° C., YELLOWNESS) | | | | | |
|---|---|---|---|---|---|---|---|
| | | 0 Min. | 15 Min. | 30 Min. | 60 Min. | 120 Min. | 180 Min. |
| 3-6 | PENTACOSANE-12-14-DITHIONE | 5 | 8 | 10 | 14 | 24 | 54 |
| 3-7 | 3-THIOACETYLPENTANE-2,4-DITHIONE | 4 | 6 | 8 | 12 | 18 | 52 |
| 3-8 | 2-ACETYLDECANE-3-THIONE | 6 | 8 | 10 | 14 | 20 | 54 |
| 3-9 | 6-OXO-7-HEXANOYL-TRIDECANE-8-THIONE | 5 | 8 | 8 | 14 | 24 | 54 |
| 3-10 | 1-PHENYLBUTANE-1,3-DITHIONE | 4 | 6 | 8 | 10 | 18 | 52 |
| 3-11 | 1-PHENYLEICOSANE-1,3-DITHIONE | 5 | 8 | 10 | 14 | 24 | 54 |
| 3-12 | 1-BENZOYLTRIDECANE-2-THIONE | 6 | 7 | 12 | 12 | 22 | 54 |
| 3-13 | 1-BENZOYLOCTANE-2-THIONE | 8 | 9 | 10 | 12 | 24 | 56 |
| 3-14 | CALCIUM(PENTANE-2,4-DITHIONE) | 6 | 10 | 12 | 14 | 22 | 54 |
| 3-15 | SODIUM(2-ACETYLDECANE-3-THIONE) | 8 | 9 | 12 | 16 | 24 | 56 |
| 3-16 | DI(METHOXYCARBONYL-ETHYL)TIN(1-BENZOYL-PROPANE-2-THIONE) | 6 | 10 | 12 | 14 | 22 | 54 |

These results demonstrate the helpful effect according to the invention of stabilizer compositions comprising a thio-1,3-dicarbonyl compound in minimizing yellowing of vinyl chloride polymer compositions whose heat stability problem is rendered more severe by the presence of chlorinated polyethylene and chlorinated paraffin additives.

EXAMPLE 4

The effect of stabilizer compositions of this invention on a polymer blend of polyvinylchloride resin and ABS resin was examined in the same way as EXAMPLE 1 according to the following formulation.

The results are shown in Table 5.

| (FORMULATION) | | |
|---|---|---|
| POLYVINYLCHLORIDE RESIN | 80 | parts by weight |
| ABS resin | 20 | |
| PN-250 (POLYESTER PLASTICIZER) | 25 | |
| EPOXIDIZED SOYBEAN OIL | 5.0 | |
| Ba NONYLPHENOLATE | 1.5 | |
| Zn OCTOATE | 0.5 | |
| STEARIC ACID | 0.5 | |
| THIO-1,3-DICARBONYL COMPOUND (TABLE-5) | 0.1 | |

TABLE 5

| NO. | SAMPLE COMPOUNDS | HEAT DETERIORATION (190° C., YELLOWNESS) | | | | |
|---|---|---|---|---|---|---|
| | | 0 Min. | 15 Min. | 30 Min. | 60 Min. | 120 Min. |
| CONTROL 4-1 | NONE | 24 | 26 | 26 | >60 | — |
| EXAMPLE 4-1 | 2-THIOXONONAN-4-ONE | 8 | 8 | 12 | 22 | 58 |
| 4-2 | 3-OXODECANE-5-THIONE | 8 | 10 | 12 | 24 | 60 |
| 4-3 | 18-OXOHEPTATRIA-CONTAN-20-THIONE | 10 | 10 | 12 | 22 | 60 |
| 4-4 | HENEICOSANE-2,4-DITHIONE | 10 | 12 | 16 | 22 | 58 |
| 4-5 | 3-THIOACETYLPENTANE-2,4-DITHIONE | 8 | 8 | 10 | 18 | 52 |
| 4-6 | 1-BENZOYLPROPANE-2-THIONE | 10 | 12 | 14 | 22 | 58 |
| 4-7 | 1-PHENYL-1-THIO-XOOCTANE-3-ONE | 8 | 10 | 12 | 24 | 58 |
| 4-8 | 1-BENZOYLNONADECANE-2-THIONE | 8 | 10 | 12 | 24 | 56 |
| 4-9 | 1-PHENYLBUTANE-1,3-DITHIONE | 6 | 10 | 8 | 16 | 54 |
| 4-10 | 1-BENZOYLOCTANE-2-THIONE | 8 | 10 | 12 | 24 | 58 |
| 4-11 | ZINC(2-OXODECANE-4-THIONE) | 6 | 8 | 10 | 16 | 56 |
| 4-12 | SODIUM(PENTACOSANE-12,14-DITHIONE) | 10 | 12 | 14 | 18 | 54 |
| 4-13 | POTASSIUM(1-BENZOYL-PROPANE-2-THIONE) | 8 | 10 | 12 | 18 | 52 |
| 4-14 | DI-n-BUTYLTIN(1-PHENYLBUTANE-1,3-DITHIONE) | 10 | 10 | 14 | 16 | 56 |

TABLE 5-continued

| NO. | SAMPLE COMPOUNDS | HEAT DETERIORATION (190° C., YELLOWNESS) | | | | |
|---|---|---|---|---|---|---|
| | | 0 Min. | 15 Min. | 30 Min. | 60 Min. | 120 Min. |
| 4-15 | NICKEL(1,4-DIPHENYL-1-THIOXOBUTANE-3-ONE | 8 | 10 | 14 | 20 | 60 |
| 4-16 | STRONTIUM(1,1-DIBENZOYL-2-PHENYLETHANE-2-THIONE) | 10 | 12 | 18 | 24 | 60 |

These results demonstrate the outstanding effectiveness of stabilizer compositions comprising thio-1,3-dicarbonyl compounds according to this invention in minimizing yellowing of the plasticized PVC-ABS polymer compositions. Remarkably, all the samples according to the invention were no more yellowed after 60 minutes exposure at 190° C. then unexposed control samples lacking any thio-1,3-dicarbonyl compound.

EXAMPLE 5

The enhanced stabilizing effect observed when there are incorporated additional stabilizers and stabilizing auxiliary materials into the stabilizer composition of this invention was examined in the same way as EXAMPLE 1 using the following compound.

The results are shown in Table 6.

| (FORMULATION) | | |
|---|---|---|
| POLYVINYLCHLORIDE RESIN (GEON 103EP) | 100 | parts by weight |
| EPOXIDIZED SOYBEAN OIL | 2.0 | |
| DIOCTYLPHTHALATE (DOP) | 70 | |
| Zn OCTOATE | 0.5 | |
| Ba STEARATE | 0.5 | |
| 1-BENZOYL-2-PHENYLETHANE-2-THIONE | 0.05 | |
| ADDITIVES (TABLE-6) | 0.1 | |

The results of these examples demonstrate the further improvement in initial color, clarity, and minimal yellowing obtained by including the additives of Examples 5-2 to 5-12 with the thio-1,3-dicarbonyl compound and metal salt stabilizer compositions of this invention.

EXAMPLE 6

This example shows the further effect obtained when a thio-1,3-dicarbonyl compound is incorporated with an organotin compound in the stabilizer composition of this invention.

Samples of the following formulation were processed by mixing roll to prepare specimens of 1 mm thickness, which were examined for initial color and 175° C. oven heat stability to determine the color after 2 hours at 175° C.

The results obtained are shown in Table 7.

| (FORMULATION) | | |
|---|---|---|
| PVC (GEON 103EP-8) | 100 | parts by weight |
| BUTYLSTEARATE | 0.5 | |
| MARK LS-3 (oligomeric lubricant) | 0.3 | |
| SAMPLE COMPOUND (TABLE -7) | 0.2 | |
| ORGANOTIN COMPOUND (TABLE-7) | 3.0 | |

TABLE 6

| NO. | ADDITIVES | HEAT DETERIORATION (190° C., YELLOWNESS) | | | | CLARITY |
|---|---|---|---|---|---|---|
| | | 0 Min. | 30 Min. | 60 Min. | 120 Min. | |
| EXAMPLE | | | | | | |
| 5-1 | NONE | 6 | 16 | 24 | 58 | GOOD |
| 5-2 | BHT | 5 | 12 | 16 | 54 | VERY GOOD |
| 5-3 | DLTDP | 4 | 14 | 14 | 52 | VERY GOOD |
| 5-4 | TRISNONYLPHENYL-PHOSPHITE | 4 | 12 | 16 | 52 | VERY GOOD |
| 5-5 | OCTYLDIPHENYL-PHOSPHITE | 4 | 12 | 15 | 52 | VERY GOOD |
| 5-6 | DIPHENYLUREA | 5 | 15 | 16 | 53 | VERY GOOD |
| 5-7 | 1,4-BUTANEDIOL BIS(AMINOCROTONATE) | 4 | 12 | 14 | 54 | GOOD |
| 5-8 | NITRILOTRIACETIC ACID TRIBUTYLAMIDE | 4 | 12 | 14 | 50 | GOOD |
| 5-9 | TETRA($C_{12-15}$ MIXED ALKYL)BISPHENOL A DIPHOSPHITE | 4 | 14 | 16 | 52 | VERY GOOD |
| 5-10 | 2-PHENYLINDOL | 5 | 15 | 18 | 53 | VERY GOOD |
| 5-11 | PENTAERYTHRITOL | 5 | 14 | 18 | 54 | VERY GOOD |
| 5-12 | BISPHENOL A | 5 | 12 | 16 | 54 | GOOD |

TABLE 7

| NO. | ORGANIC TIN COMPOUNDS | SAMPLE COMPOUNDS | INITIAL COLOR % YELLOW | HEAT COLOR (175° C., AFTER 120 Min.) % YELLOW |
|---|---|---|---|---|
| CONTROL | | | | |
| 6-1 | DIBUTYLTIN DILAURATE | NONE | 35 | 60 |
| EXAMPLE | | | | |

TABLE 7-continued

| NO. | ORGANIC TIN COMPOUNDS | SAMPLE COMPOUNDS | INITIAL COLOR % YELLOW | HEAT COLOR (175° C., AFTER 120 Min.) % YELLOW |
|---|---|---|---|---|
| 6-1 | DIBUTYLTIN DILAURATE | 2-THIOXOHEPTA-DECAN-4-ONE | 10 | 24 |
| 6-2 | DIBUTYLTIN DILAURATE | HENEICOSANE-2,4-DITHIONE | 12 | 22 |
| 6-3 | DIBUTYLTIN DILAURATE | 1-BENZOYLPROPANE-2-THIONE | 10-12 | 20 |
| 6-4 | DIBUTYLTIN DILAURATE | 1-BENZOYL-2-PHENYLETHANE-2-THIONE | 10 | 20 |
| CONTROL 6-2 | DIBUTYLTIN MALEATE | NONE | 10 | 54 |
| EXAMPLE 6-5 | DIBUTYLTIN MALEATE | 4-OXOTRIDECANE-6-THIONE | 8 | 22 |
| 6-6 | DIBUTYLTIN MALEATE | HENEICOSANE-2,4-DITHIONE | 8 | 22 |
| 6-7 | DIBUTYLTIN MALEATE | 1-BENZOYLNONA-DECANE-2-THIONE | 8 | 20-22 |
| CONTROL 6-3 | DIBUTYLTIN BIS(ISOOCTYLTHIO-GLYCOLATE) | NONE | 8 | 33 |
| EXAMPLE 6-8 | DIBUTYLTIN BIS(ISOOCTYLTHIO-GLYCOLATE) | PENTACOSANE-12,14-DITHIONE | 6 | 20 |
| 6-9 | DIBUTYLTIN BIS(ISOOCTYLTHIO-GLYCOLATE) | 1-BENZOYLPROP-ANE-2-THIONE | 6 | 20 |
| 6-10 | DIBUTYLTIN BIS(ISOOCTYLTHIO-GLYCOLATE) | 1-HEXAHYDRO-BENZOYL-2-CYCLO-HEXYLETHANE-2-THIONE | 6-7 | 22 |
| 6-11 | DIBUTYLTIN BIS(ISOOCTYLTHIO-GLYCOLATE) | 1,3-DIPHENYL-PROPANE-1,3-DITHIONE | 6 | 20 |

The results of these examples demonstrate the dramatically superior initial color and minimal yellowing of vinyl chloride polymer compositions stabilized with a thio-1,3-dicarbonyl compound and alkyltin compound combination according to this invention.

We claim:

1. A stabilizer composition for increasing the resistance to yellowing and loss of clarity upon heating at 175° C. of a vinyl halide polymer, comprising (A) at least one thio-1,3-dicarbonyl compound represented by the formula

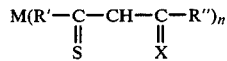

in which M represents a hydrogen atom, an organotin group, or one of the metals Li, Na, K, Mg, Ca, Sr, Ba, Zn, Al, Sb, Ni, Sn, Cu or Zr; R represents a hydrogen atom, an alkyl group, an aryl group, an alkaryl group, an aralkyl group, an alkenyl group, or a group

R', R" and R''' each independently represent a hydrogen atom, an alkyl group, an alkenyl group, an alkoxyaryl group, an alkaryl group, an aralkyl group, a cycloalkyl group, or a cycloalkenyl group, any of which can carry a halogen substituent; X independently at each occurrence is oxygen or sulfur; and n representing the valence of M is an integer from 1 to 4; and (B) at least one heat stabilizer which is an alkyltin compound or a metal salt of a non-nitrogeneous monocarboxylic acid having 6 to 24 carbon atoms or of a hydrocarbon-substituted phenol having 10 to 30 carbon atoms.

2. A stabilizer composition according to claim 1 in which the heat stabilizer is a salt of the metals barium, calcium, dialkyltin, magnesium, strontium, tin, and zinc.

3. A stabilizer composition according to claim 1 in which the heat stabilizer is a salt of 2-ethylhexoic acid, neodecanoic acid, lauric acid, stearic acid, or nonylphenol.

4. A stabilizer composition according to claim 1 in which the heat stabilizer is an alkyltin mercaptide having linked to tin from 1 to 2 alkyl groups having 1 to 12 carbon atoms.

5. A stabilizer composition according to claim 1 in which the heat stabilizer is an alkyltin sulfide.

6. A stabilizer composition according to claim 4 in which the alkyltin mercaptide is represented by the formula $R_aSn(S(CH_2)_bY)_{4-a}$ in which R is an alkyl group having 1 to 12 carbon atoms, a is 2 or 3, b is an integer from 1 to 3, and Y is a hydrogen atom, an alkyl group having 6 to 18 carbon atoms, an alkoxy group having 6 to 18 carbon atoms, an acyloxy group having 2 to 22 carbon atoms, or a carboxyalkyl group having 1 to 18 carbon atoms in the alkyl group.

7. A stabilizer composition according to claim 1 in which at least one of R' and R''' represent an aryl group.

8. A stabilizer composition according to claim 7 in which R' and R'' are phenyl.

9. A stabilizer composition according to claim 1 in which M is hydrogen.

10. A stabilizer composition according to claim 1 in which M is an alkali metal.

11. A stabilizer composition according to claim 1 in which M is an alkaline earth metal.

12. A stabilizer composition according to claim 1 comprising as an additional ingredient a heat stabilizer compound selected from the group consisting of 1,2-epoxides; phenols; organic phosphites; thioethers and thioether carboxylic acids; esters and amides of thioalkylenedicarboxylic, 3-aminocrotonic, and nitrilotrialkylene tricarboxylic acids; diphenylurea and 2-phenylindole.

13. A stabilized vinyl chloride polymer composition comprising a vinyl chloride polymer and a stabilizer composition according to claim 1.

14. A stabilized vinyl chloride polymer composition according to claim 13 in which the vinyl chloride polymer is a homopolymer of vinyl chloride.

15. A stabilized vinyl chloride polymer composition according to claim 13 in which the vinyl chloride polymer is a copolymer of vinyl chloride and a co-monomer selected from the group consisting of propylene, ethylene, 1-butene, 1-hexene, vinyl acetate, acrylonitrile, and diethyl maleate.

16. A stabilized vinyl chloride polymer composition according to claim 13 comprising as an additional ingredient an additive selected from the group consisting of chlorinated polyethylene, chlorinated paraffin, and acrylonitrile-butadiene-styrene polymer.

* * * * *